United States Patent
Fujii et al.

(10) Patent No.: US 12,294,856 B2
(45) Date of Patent: May 6, 2025

(54) RELAY SYSTEM, METHOD FOR RELAYING WIRELESS COMMUNICATION, AND RELAY BASE STATION

(71) Applicant: TOYOTA JIDOSHA KABUSHIKI KAISHA, Toyota (JP)

(72) Inventors: Shinichiroh Fujii, Kawasaki (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 198 days.

(21) Appl. No.: 18/342,962

(22) Filed: Jun. 28, 2023

(65) Prior Publication Data

US 2024/0022905 A1    Jan. 18, 2024

(30) Foreign Application Priority Data

Jul. 14, 2022    (JP) ................................ 2022-113289

(51) Int. Cl.
    *H04W 12/06*    (2021.01)
    *H04B 7/155*    (2006.01)
    *H04L 9/40*    (2022.01)

(52) U.S. Cl.
    CPC ............ *H04W 12/06* (2013.01); *H04B 7/155* (2013.01); *H04L 63/08* (2013.01)

(58) Field of Classification Search
    CPC ......... H04W 12/06; H04B 7/155; H04L 63/08
    See application file for complete search history.

(56) References Cited

U.S. PATENT DOCUMENTS

| | | | | |
|---|---|---|---|---|
| 6,700,506 B1 * | 3/2004 | Winkler | ................. | G08G 1/123 701/465 |
| 11,790,465 B2 * | 10/2023 | Shike | .................... | H04W 4/029 705/345 |
| 2010/0219234 A1 * | 9/2010 | Forbes | ................. | G06Q 20/045 455/414.1 |
| 2010/0308966 A1 * | 12/2010 | Oki | ........................ | G06Q 10/08 340/10.1 |

(Continued)

FOREIGN PATENT DOCUMENTS

| | | |
|---|---|---|
| EP | 2 152 021 A1 | 2/2010 |
| JP | 11-196474 A | 7/1999 |

(Continued)

*Primary Examiner* — Chau Le
(74) *Attorney, Agent, or Firm* — Sughrue Mion, PLLC (57) ABSTRACT

In a relay system, an authentication device determines whether a registered identifier of a registered terminal possessed by a user in a vehicle matches an identifier of a first communication terminal received from a relay base station via a base station, generates a permission signal indicating whether to permit relay of wireless communication between the first communication terminal and the base station, depending on the result of determination, and sends the generated permission signal to the relay base station via the base station. The relay base station relays wireless communication between the first communication terminal and the base station when the permission signal indicates that the relay of wireless communication is permitted. The relay base station omits to relay the wireless communication for the communication terminal when the permission signal indicates that the relay of wireless communication is not permitted.

5 Claims, 7 Drawing Sheets

(56) References Cited

U.S. PATENT DOCUMENTS

| | | | |
|---|---|---|---|
| 2016/0234037 A1* | 8/2016 | Mabuchi | H04L 12/66 |
| 2019/0275910 A1* | 9/2019 | Inoue | B60L 55/00 |
| 2021/0350341 A1* | 11/2021 | Song | G06Q 20/0457 |
| 2022/0338005 A1* | 10/2022 | Tamai | H04L 9/3228 |

FOREIGN PATENT DOCUMENTS

| | | | |
|---|---|---|---|
| JP | 2004-287548 A | 10/2004 | |
| JP | 2006-129260 A | 5/2006 | |
| JP | 2009-182391 A | 8/2009 | |
| JP | 2010-108228 A | 5/2010 | |
| JP | 2014-127132 A | 7/2014 | |
| WO | 2008/126140 A1 | 10/2008 | |
| WO | 2008/146840 A1 | 12/2008 | |
| WO | 2009/072448 A1 | 6/2009 | |

\* cited by examiner

RELAY SYSTEM, METHOD FOR RELAYING WIRELESS COMMUNICATION, AND RELAY BASE STATION

FIELD

The present invention relates to a relay system using a relay base station mounted on a vehicle, a method for relaying wireless communication executed by the relay system, and a relay base station.

BACKGROUND

A technique to enable only communication terminals in a predetermined facility to connect to the Internet has been proposed (see Japanese Unexamined Patent Publication JP2009-182391A).

A communication system disclosed in JP2009-182391A analyzes distance information included in the result of communication with a communication terminal received from a communication device in a facility, and determines that authentication has succeeded when it is determined that the communication terminal is in the facility. When authentication succeeds, the communication terminal is provided with connection information required for connection to an access point via the communication device in the facility.

SUMMARY

In the above-described technique, the distance between a base station and a communication terminal is used for determining whether the communication terminal is in the facility. However, even if the distance between a base station and a communication terminal is shorter than the distance from the base station to an end of the facility, the communication terminal may be outside the facility. In such a case, the connection information may be provided for the communication terminal outside the facility.

It is an object of the present invention to provide a relay system that can limit communication terminals for which a service of relay of wireless communication is provided to ones possessed by users in a vehicle.

According to an embodiment, a relay system including an authentication device connected to a base station, and a relay base station mounted on a vehicle and configured to relay wireless communication between the base station and at least one communication terminal is provided. In the relay system, the authentication device is configured to: determine whether a registered identifier of a registered terminal possessed by a user in the vehicle matches an identifier of a first communication terminal, which is among the at least one communication terminal, received from the relay base station via the base station; generate a permission signal indicating whether to permit relay of wireless communication between the first communication terminal and the base station, depending on the result of determination; and send the generated permission signal to the relay base station via the base station. The relay base station is configured to: relay wireless communication between the first communication terminal and the base station when the permission signal indicates that the relay of wireless communication is permitted, and omit to relay wireless communication between the first communication terminal and the base station when the permission signal indicates that the relay of wireless communication is not permitted.

Preferably, the authentication device of the relay system is further configured to register an identifier of a second communication terminal possessed by a user among the at least one communication terminal as one of the registered identifiers; the identifier is obtained via a reader provided in the vehicle for recording the user getting on and off the vehicle, when the user gets on the vehicle; and when the identifier of the second communication terminal obtained via the reader at the time when the user gets off the vehicle matches any of the registered identifiers, delete the matched registered identifier.

Alternatively, the authentication device of the relay system is preferably further configured to obtain an identifier of a second communication terminal possessed by a user among the at least one communication terminal, together with riding period information indicating a riding period during which the user is in the vehicle, earlier than a start time of the riding period, and register the identifier of the second communication terminal possessed by the user as the registered identifier only during the riding period.

According to another embodiment, a method for relaying wireless communication by a relay system including an authentication device connected to a base station, and a relay base station mounted on a vehicle and configured to relay wireless communication between the base station and at least one communication terminal is provided. The method includes: determining, by the authentication device, whether a registered identifier of a registered terminal possessed by a user in the vehicle matches an identifier of a first communication terminal, which is among the at least one communication terminal, received from the relay base station via the base station; generating, by the authentication device, a permission signal indicating whether to permit relay of wireless communication between the first communication terminal and the base station, depending on the result of determination; sending, by the authentication device, the generated permission signal to the relay base station via the base station; relaying, by the relay base station, wireless communication between the first communication terminal and the base station when the permission signal indicates that the relay of wireless communication is permitted; and omitting, by the relay base station, to relay wireless communication between the first communication terminal and the base station when the permission signal indicates that the relay of wireless communication is not permitted.

According to still another embodiment, a relay base station mounted on a vehicle and capable of relaying wireless communication between a base station and at least one communication terminal is provided. The relay base station includes a memory configured to store a registered identifier of a registered terminal possessed by a user in the vehicle; and a processor configured to determine whether the registered identifier matches an identifier of a first communication terminal received by wireless communication, determine whether to permit relay of wireless communication between the first communication terminal and the base station, depending on the result of determination of match, the first communication terminal being among the at least one communication terminal, relay wireless communication between the first communication terminal and the base station when it is determined that the relay of wireless communication is permitted and omit to relay wireless communication between the first communication terminal and the base station when it is determined that the relay of wireless communication is not permitted.

The relay system according to the present disclosure has an advantageous effect of being able to limit communication terminals for which a service of relay of wireless communication is provided to ones possessed by users in a vehicle.

DESCRIPTION OF EMBODIMENTS

A relay system, a method for relaying communication executed by the relay system, as well as a relay base station and an authentication device included in the relay system will now be described with reference to the attached drawings. The relay system determines whether a registered identifier of a communication terminal possessed by a user in a vehicle matches an identifier of a terminal received from a relay base station mounted on the vehicle via a base station. Only when both identifiers match, does the relay base station relay wireless communication between the terminal and the base station. In this way, the relay system can provide a service of relay of wireless communication only for terminals possessed by users in the vehicle. In the following, relaying wireless communication between a base station and at least one communication terminal will be referred to simply as "relay communication."

Figure 1:
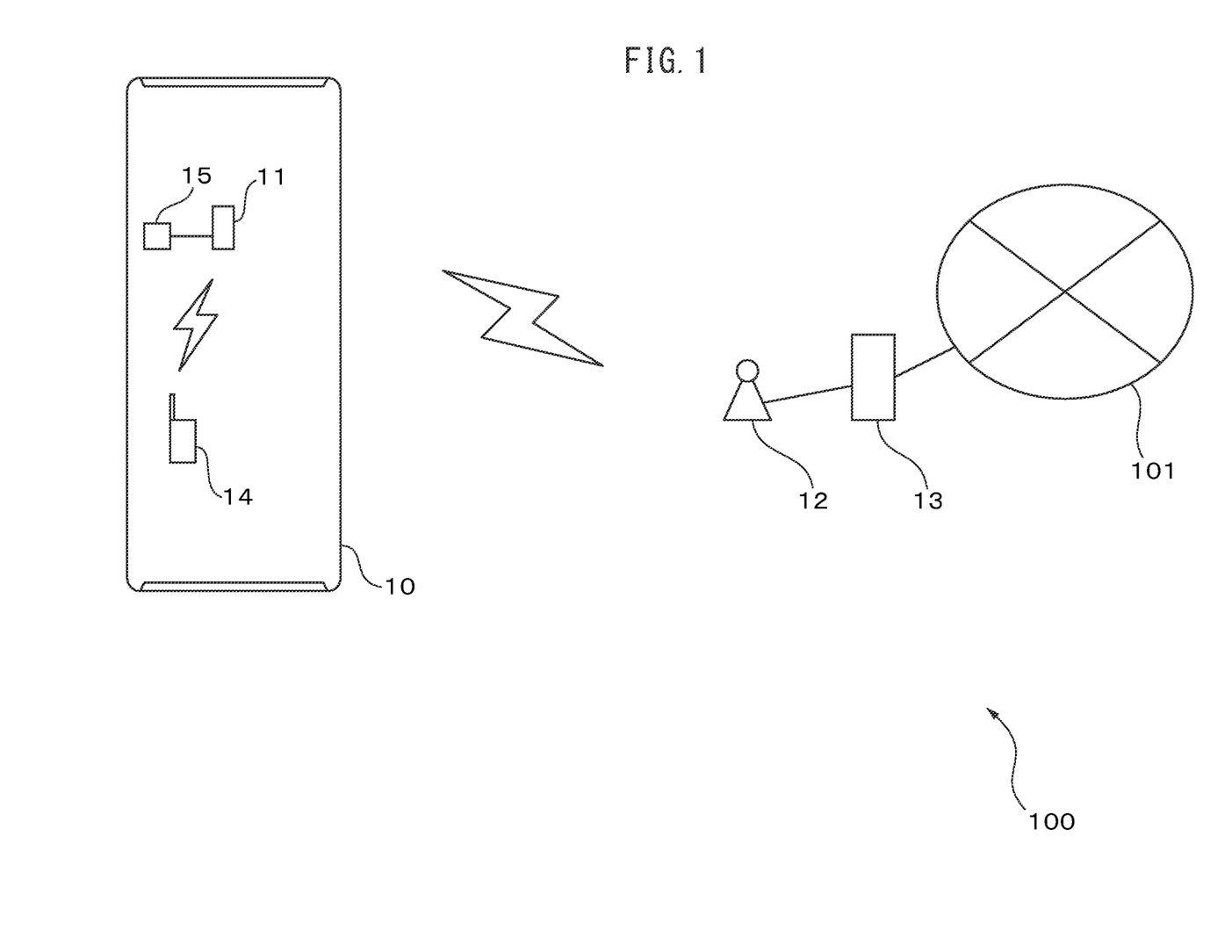
FIG. 1 schematically illustrates the configuration of a relay system.

FIG. 1 schematically illustrates the configuration of the relay system. The relay system 100 includes a wireless communication device 11, which is an example of the relay base station, mounted on a vehicle 10, a base station 12 connected to a core network 101, and an authentication device 13 connected between the base station 12 and the core network 101. The wireless communication device 11 can relay wireless communication between the base station 12 and at least one communication terminal 14. The authentication device 13 compares the identifier of a communication terminal received from the wireless communication device 11 with that of a preregistered communication terminal among the at least one communication terminal 14. Depending on the result of comparison, the authentication device 13 determines whether to permit relay communication between the base station 12 and the communication terminal corresponding to the identifier received from the wireless communication device 11.

The vehicle 10 equipped with the wireless communication device 11 is a vehicle that multiple users can ride, such as a bus, and includes the wireless communication device 11 and an RFID reader 15. The RFID reader 15 is communicably connected to the wireless communication device 11 via an in-vehicle network conforming to a standard such as a controller area network.

The RFID reader 15, which is an example of the reader for recording a user getting on and off the vehicle 10, is provided near a door of the vehicle 10. The RFID reader 15 can communicate with the communication terminal 14 in accordance with a method of communication conforming to a near-field communication standard, such as ISO/IEC 18092 or ISO/IEC 21481. When a user brings his/her communication terminal 14 near the RFID reader 15 at getting on or off the vehicle 10, the RFID reader 15 reads the identifier of the communication terminal 14. The RFID reader 15 outputs the read identifier to the wireless communication device 11 via the in-vehicle network. The identifier of the communication terminal 14 may be a number uniquely assigned to the communication terminal 14, such as International Mobile Subscriber Identity (IMSI), or an identification number assigned to the user himself/herself.

The wireless communication device 11, which is an example of the relay base station, can relay wireless communication between the base station 12 placed outside the vehicle 10 and the at least one communication terminal 14. In the present embodiment, the wireless communication device 11 relays wireless communication between the base station 12 and a communication terminal for which relay of wireless communication is permitted by the authentication device 13 among the at least one communication terminal 14.

Figure 2:
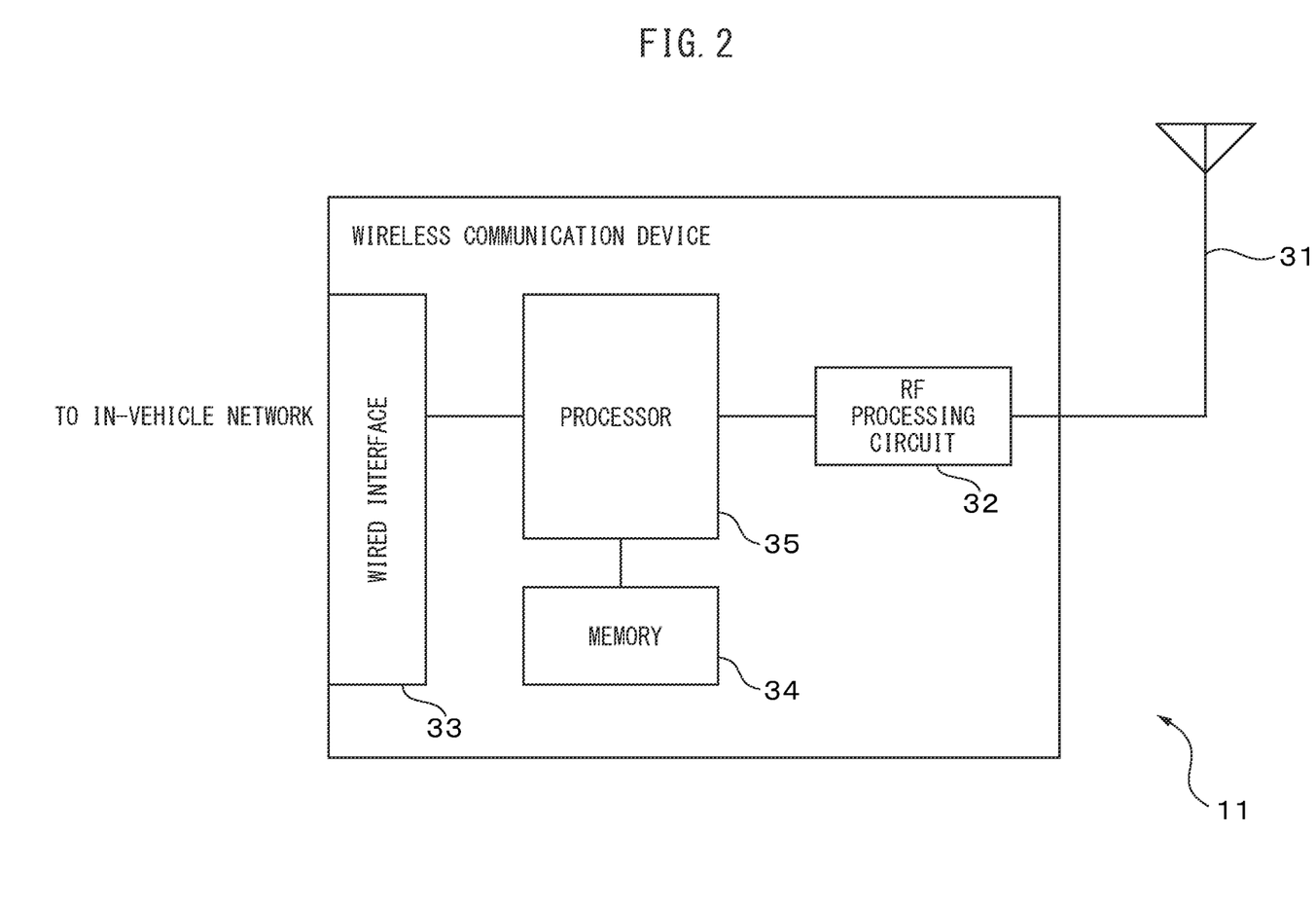
FIG. 2 illustrates the hardware configuration of a wireless communication device.

FIG. 2 illustrates the hardware configuration of the wireless communication device 11. The wireless communication device 11 includes an antenna 31, a radio-frequency (RF) processing circuit 32, a wired interface 33, a memory 34, and a processor 35. The RF processing circuit 32, the wired interface 33, the memory 34, and the processor 35 may be mounted on the wireless communication device 11 as separate circuits or a single integrated circuit.

The antenna 31 sends an uplink signal or a downlink relay signal transmitted from the RF processing circuit 32 as a radio signal. Further, the antenna 31 receives a radio signal from the base station 12, converts the signal to an electrical signal to generate a downlink signal, and transmits the downlink signal to the RF processing circuit 32. In addition, the antenna 31 receives a radio signal from a communication terminal, converts the signal to an electrical signal, and transmits the electrical signal to the RF processing circuit 32. The radio signal received from a communication terminal includes a connection request signal or an uplink relay signal. The antenna 31 may include an antenna for communication with the base station 12 and an antenna for communication with the communication terminal 14 separately.

The RF processing circuit 32 converts an uplink signal or a downlink relay signal received from the processor 35 to an analog signal, and then superposes the analog signal on a carrier wave having a radio frequency specified by the processor 35. The RF processing circuit 32 amplifies the uplink signal or the relay signal superposed on the carrier wave to a desired level with a high-power amplifier (not illustrated), and transmits the amplified uplink signal or relay signal to the antenna 31.

Further, the RF processing circuit 32 amplifies a downlink signal, a connection request signal, or an uplink relay signal received from the antenna 31 with a low-noise amplifier (not illustrated). The RF processing circuit 32 multiplies the amplified downlink signal, connection request signal, or relay signal by a periodic signal having an intermediate frequency to convert the frequency of the downlink signal, the connection request signal, or the relay signal from the radio frequency to a baseband frequency. The RF processing circuit 32 executes analog-to-digital conversion of the downlink signal, the connection request signal, or the relay signal having a baseband frequency, and then passes the signal to the processor 35.

The wired interface 33 includes an interface circuit for connecting the wireless communication device 11 to the in-vehicle network. In other words, the wired interface 33 is connected to the RFID reader 15 via the in-vehicle network. The wired interface 33 passes the identifier of the communication terminal 14 received from the RFID reader 15 to the processor 35.

The memory 34, which is an example of the storage unit, includes, for example, a read-only nonvolatile semiconductor memory and a rewritable nonvolatile or volatile semiconductor memory. The memory 34 stores various types of information for communication with the base station 12 and the communication terminal 14, the identifier of the vehicle 10, and various programs executed by the wireless communication device 11. In addition, the memory 34 may temporarily store signals received from the base station 12 or the communication terminal 14 (e.g., a connection request signal or a permission signal) and signals to be sent to the base station 12 or the communication terminal 14. Further, the memory 34 may temporarily store the identifier of the communication terminal 14 from which a connection request signal is received.

The processor 35 includes one or more central processing units (CPUs) and a peripheral circuit thereof. The processor 35 may further include another operating circuit, such as a logic-arithmetic unit or an arithmetic unit. The processor 35 executes a process related to wireless communication between the base station 12 and the wireless communication device 11 and relay communication between the base station 12 and the communication terminal 14.

Figure 3:
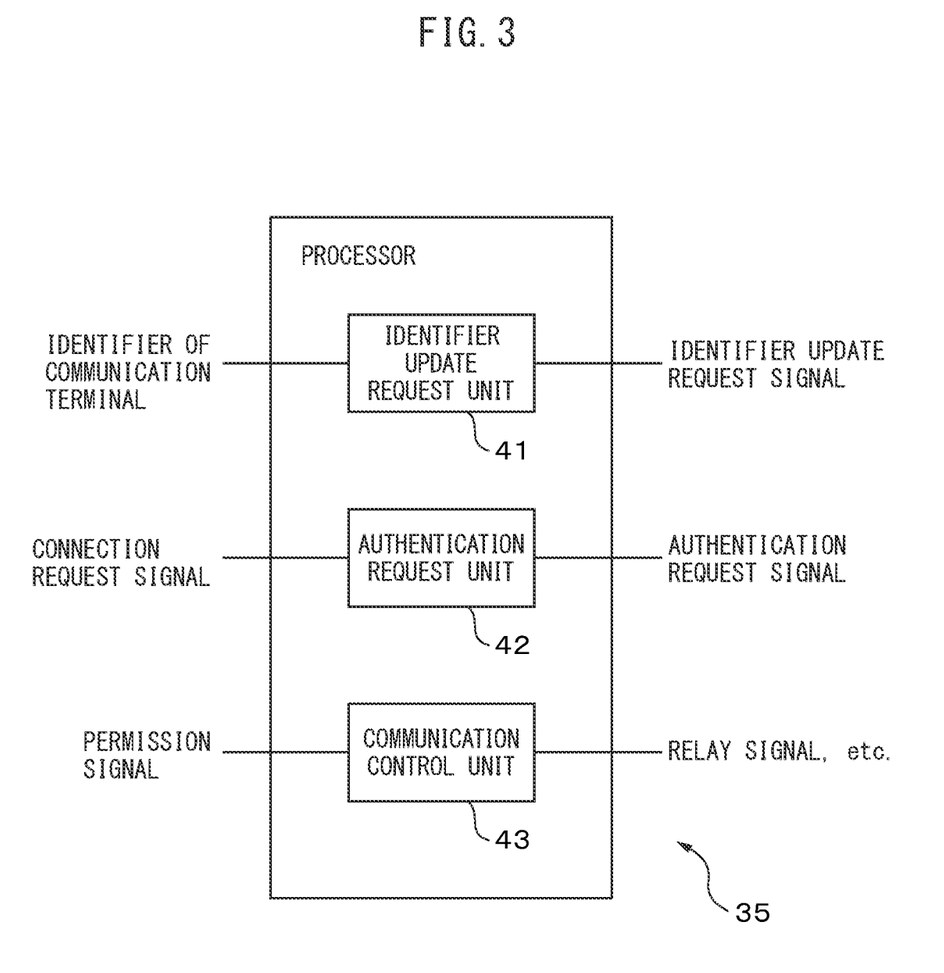
FIG. 3 is a functional block diagram of a processor of the wireless communication device.

FIG. 3 is a functional block diagram of the processor 35. The processor 35 includes an identifier update request unit 41, an authentication request unit 42, and a communication control unit 43. These units included in the processor 35 are functional modules, for example, implemented by a computer program executed by the processor 35, or may be dedicated operating circuits embedded in the processor 35.

When the identifier of a communication terminal 14 is obtained from the RFID reader 15 via the wired interface 33, the identifier update request unit 41 generates an identifier update request signal including the identifier of the communication terminal 14. The identifier update request signal is a signal for requesting the authentication device 13 to register or delete the identifier of the communication terminal 14. The communication terminal 14 corresponding to the identifier obtained from the RFID reader 15 is an example of the second communication terminal. The identifier update request unit 41 may further include the identifier of the vehicle 10 in the identifier update request signal. In addition, the identifier update request unit 41 generates an uplink signal including the generated identifier update request signal, and outputs the uplink signal to the RF processing circuit 32. The uplink signal including the identifier update request signal is sent to the base station 12 using a radio resource assigned by the base station 12, which results in the identifier update request signal being sent to the authentication device 13 via the base station 12.

When a connection request signal for requesting connection to a base station for wireless communication is received as a radio signal from a communication terminal 14, the authentication request unit 42 extracts the identifier of the communication terminal 14 included in the connection request signal. The authentication request unit 42 then generates an authentication request signal including the extracted identifier. The authentication request signal is a signal for requesting the authentication device 13 to determine whether to authenticate the communication terminal that has sent the connection request. The communication terminal 14 that has sent the connection request signal is an example of the first communication terminal. In addition, the authentication request unit 42 generates an uplink signal including the generated authentication request signal, and outputs the uplink signal to the RF processing circuit 32. The uplink signal including the authentication request signal is sent to the base station 12 using a radio resource assigned by the base station 12, which results in the authentication request signal being sent to the authentication device 13 via the base station 12.

The communication control unit 43 executes relay communication between the base station 12 and a communication terminal for which relay of wireless communication is permitted in a permission signal received from the authentication device 13 via the base station 12; the communication terminal is among communication terminals 14 from which connection request signals are received by the wireless communication device 11. In other words, the communication control unit 43 executes relay communication between the base station 12 and a communication terminal 14 corresponding to an identifier included in a permission signal indicating that relay communication is permitted. Meanwhile, the communication control unit 43 omits to execute relay communication between the base station 12 and a communication terminal 14 corresponding to an identifier included in a permission signal indicating that relay communication is not permitted. In the present embodiment, execution of relay communication is permitted for a communication terminal 14 possessed by a user in the vehicle 10, and is not permitted for a communication terminal 14 outside the vehicle 10.

When executing relay communication, the communication control unit 43 executes various processes for wireless communication between the base station 12 and the communication terminal 14 and the wireless communication device 11 in accordance with a predetermined wireless communication standard. The predetermined wireless communication standard may be, for example, a wireless communication standard related to the "fifth-generation mobile communication system" formulated by the 3rd Generation Partnership Project (3GPP, registered trademark) or a standard related to another mobile communications system. Examples of the processes for wireless communication include establishment of communication between the base station 12 and the communication terminal 14 and the wireless communication device 11, allocation of radio resources, and uplink power control. In addition, the communication control unit 43 outputs a downlink relay signal to the RF processing circuit 32 so that the relay signal received from the RF processing circuit 32 is sent to the communication terminal 14, using a radio resource allocated for wireless communication with the communication terminal 14. Similarly, the communication control unit 43 outputs an uplink relay signal to the RF processing circuit 32 so that the relay signal received from the RF processing circuit 32 is sent to the base station 12, using a radio resource allocated for wireless communication with the base station 12.

Further, the communication control unit 43 executes various processes for wireless communication between the base station 12 and the wireless communication device 11 in accordance with the predetermined wireless communication standard. In addition, the communication control unit 43 generates an uplink signal including a signal to be sent to a device outside the vehicle 10, and executes an encoding process, such as error-correction coding, on the uplink signal. The communication control unit 43 further modulates the uplink signal in accordance with a predetermined modulation scheme, and outputs the modulated uplink signal to the RF processing circuit 32. In addition, the communication control unit 43 demodulates a downlink signal received from the RF processing circuit 32, executes error-correction decoding, and extracts various types of information included in the decoded downlink signal. The communication control unit 43 may output the information extracted from the downlink signal to an electronic control unit of the vehicle 10 or a navigation device mounted on the vehicle 10 via the wired interface 33 and the in-vehicle network.

The following describes the authentication device 13. The authentication device 13 is connected between the base station 12 and the core network 101. Alternatively, the authentication device 13 may be configured as one of host nodes constituting the core network 101.

Figure 4:
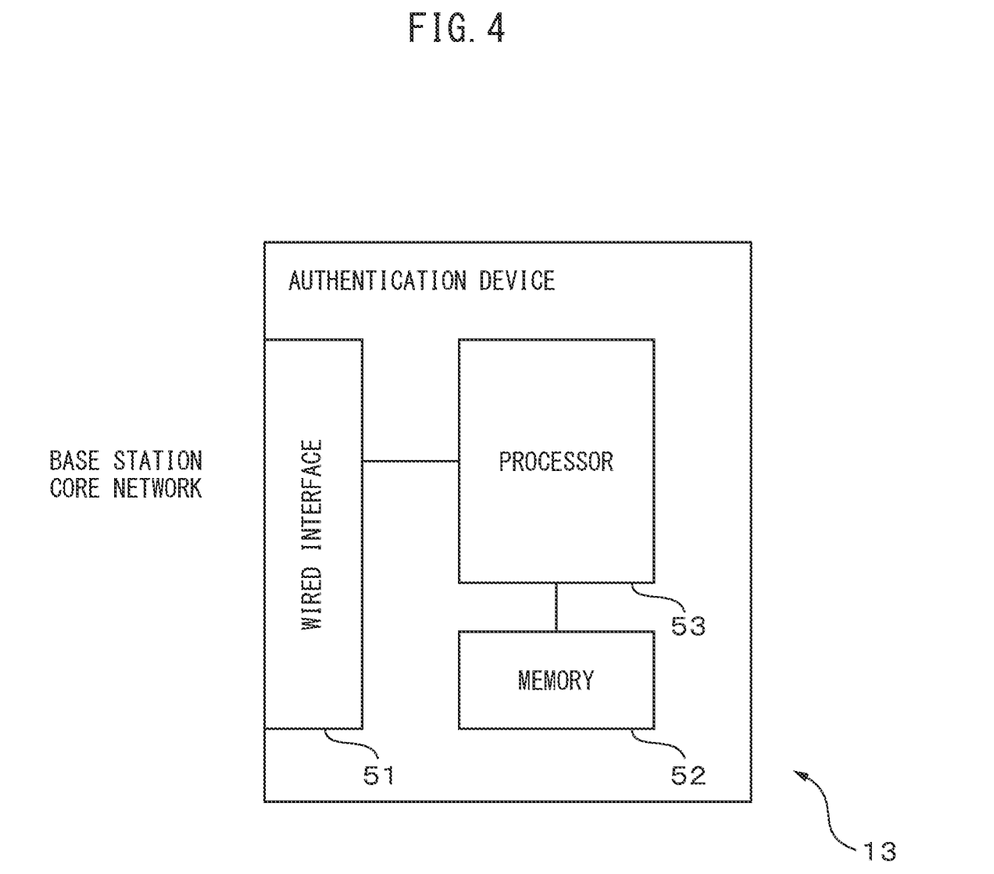
FIG. 4 illustrates the hardware configuration of an authentication device.

FIG. 4 illustrates the hardware configuration of the authentication device 13. The authentication device 13 includes a wired interface 51, a memory 52, and a processor 53. The wired interface 51, the memory 52, and the processor 53 may be mounted on the authentication device 13 as separate circuits or a single integrated circuit.

The wired interface 51 includes an interface circuit for connecting the authentication device 13 to the core network and the base station 12 in conformity with the predetermined wireless communication standard. The wired interface 51 receives an identifier update request signal sent by the wireless communication device 11 via the base station 12, and passes the received identifier update request signal to the processor 53. Similarly, the wired interface 51 receives an authentication request signal sent by the wireless communication device 11 via the base station 12, and passes the received authentication request signal to the processor 53. In addition, the wired interface 51 sends a permission signal received from the processor 53 to the wireless communication device 11 via the base station 12.

The memory 52, which is an example of a storage unit, includes, for example, a read-only nonvolatile semiconductor memory and a rewritable nonvolatile or volatile semiconductor memory. The memory 52 stores various types of information used in a process executed by the authentication device 13 and various programs executed by the authentication device 13. The various types of information used in a process executed by the authentication device 13 include registered identifiers of communication terminals 14 possessed by users in the vehicle 10. Such information may further include the identifier of the vehicle 10.

The processor 53 includes one or more central processing units (CPUs) and a peripheral circuit thereof. The processor 53 may further include another operating circuit, such as a logic-arithmetic unit or arithmetic unit. The processor 53 updates the identifiers of communication terminals 14, determines authentication of a communication terminal 14 that has sent a connection request, and determines whether to permit relay communication, based on the result of determination of authentication.

Figure 5:
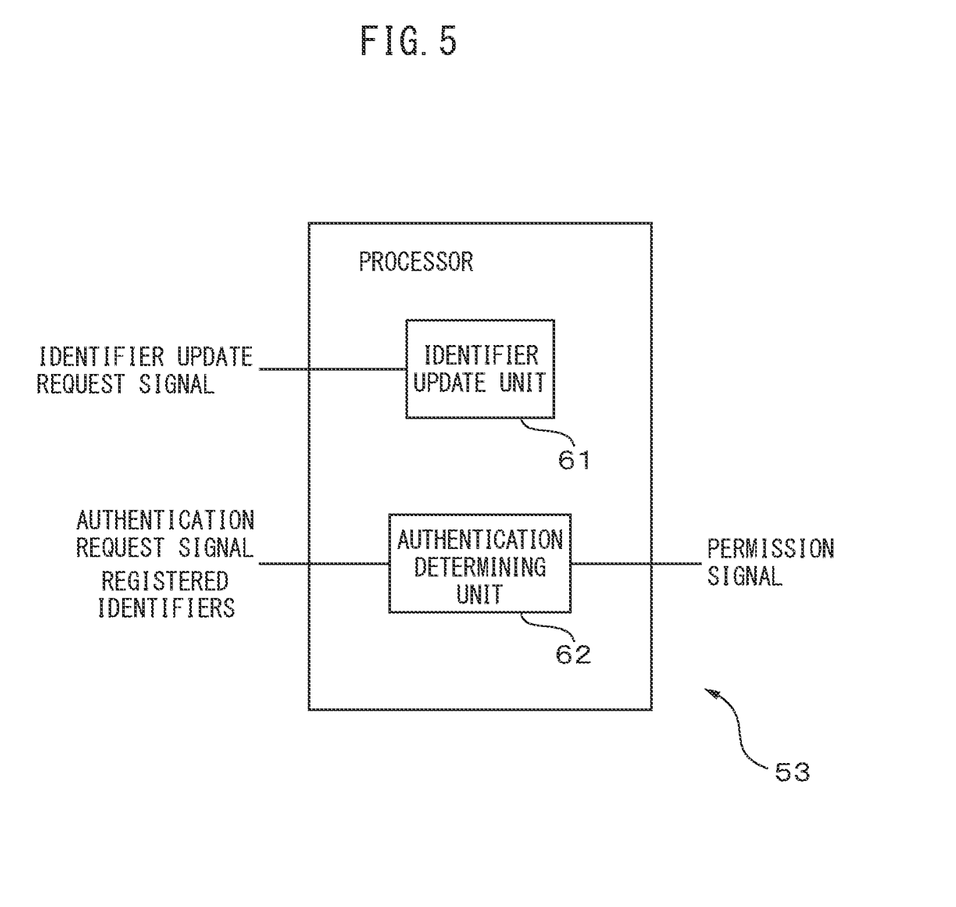
FIG. 5 is a functional block diagram of a processor of the authentication device.

FIG. 5 is a functional block diagram of the processor 53. The processor 53 includes an identifier update unit 61 and an authentication determining unit 62. These units included in the processor 53 are functional modules, for example, implemented by a computer program executed by the processor 53, or may be dedicated operating circuits embedded in the processor 53.

Every time an identifier update request signal is received, the identifier update unit 61 compares the identifier included in the received identifier update request signal with one or more registered identifiers stored in the memory 52. When the identifier included in the identifier update request signal does not match any of the registered identifiers, the identifier update unit 61 stores the identifier in the memory 52 as a newly registered identifier. When the identifier of the vehicle 10 is included in the identifier update request signal, the identifier update unit 61 may store the newly registered identifier in the memory 52 in association with the identifier of the vehicle 10. In this way, the identifier of a communication terminal 14 possessed by a user who has got on the vehicle 10 anew is stored in the memory 52 as a registered identifier. The communication terminal 14 corresponding to a registered identifier stored in the memory 52 is an example of the registered terminal.

When the identifier included in the identifier update request signal matches one of the registered identifiers, the identifier update unit 61 deletes the matched registered identifier from the memory 52. This is because the identifier included in the identifier update request signal is that of a communication terminal 14 possessed by a user who has got off the vehicle 10. Thus the memory 52 stores only the identifiers of communication terminals possessed by users in the vehicle 10 among the communication terminals 14 as the registered identifiers. With the identifier of each communication terminal stored in the memory 52, the identifier update unit 61 may associate a flag having a different value depending on whether the terminal is possessed by a user in the vehicle 10. In this case, the identifier update unit 61 rewrites the value of the flag, instead of storing and deleting an identifier.

Every time an authentication request signal is received, the authentication determining unit 62 compares the identifier included in the received authentication request signal with the registered identifiers stored in the memory 52. When the identifier included in the authentication request signal matches one of the registered identifiers, the authentication determining unit 62 authenticates the communication terminal 14 identified by the identifier included in the authentication request signal as a communication terminal possessed by a user in the vehicle 10. The authentication determining unit 62 generates a permission signal indicating that relay communication for the communication terminal 14 identified by the identifier included in the authentication request signal is permitted. The authentication determining unit 62 includes the identifier included in the authentication request signal, in the permission signal.

When the identifier included in the authentication request signal does not match any of the registered identifiers, the authentication determining unit 62 does not authenticate the communication terminal 14 identified by the identifier included in the authentication request signal because the communication terminal 14 is assumed to be outside the vehicle 10. The authentication determining unit 62 generates a permission signal indicating that relay communication for the communication terminal 14 identified by the identifier included in the authentication request signal is not permitted. In this case also, the authentication determining unit 62 includes the identifier included in the authentication request signal, in the permission signal.

The authentication determining unit 62 sends the generated permission signal to the wireless communication device 11 via the wired interface 51 and the base station 12.

Figure 6A:
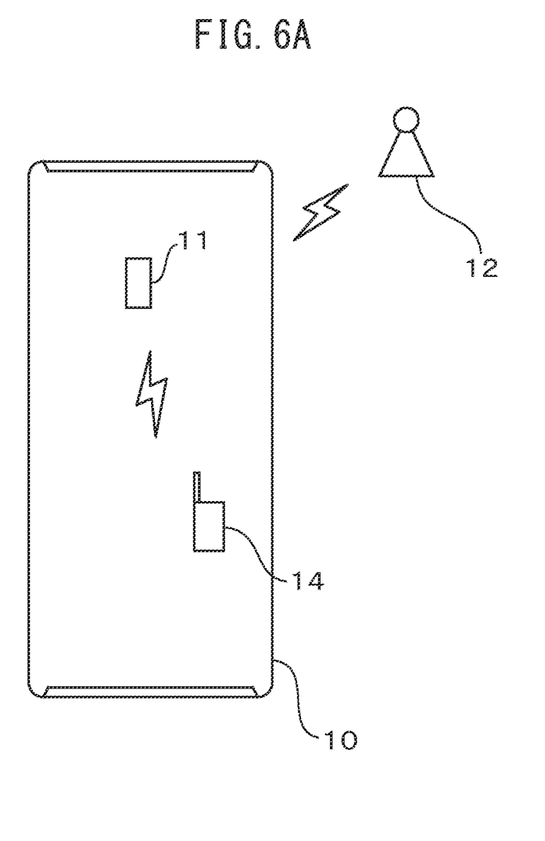
FIG. 6A is a schematic diagram for explaining a communication relay process according to the embodiment.
Figure 6B:
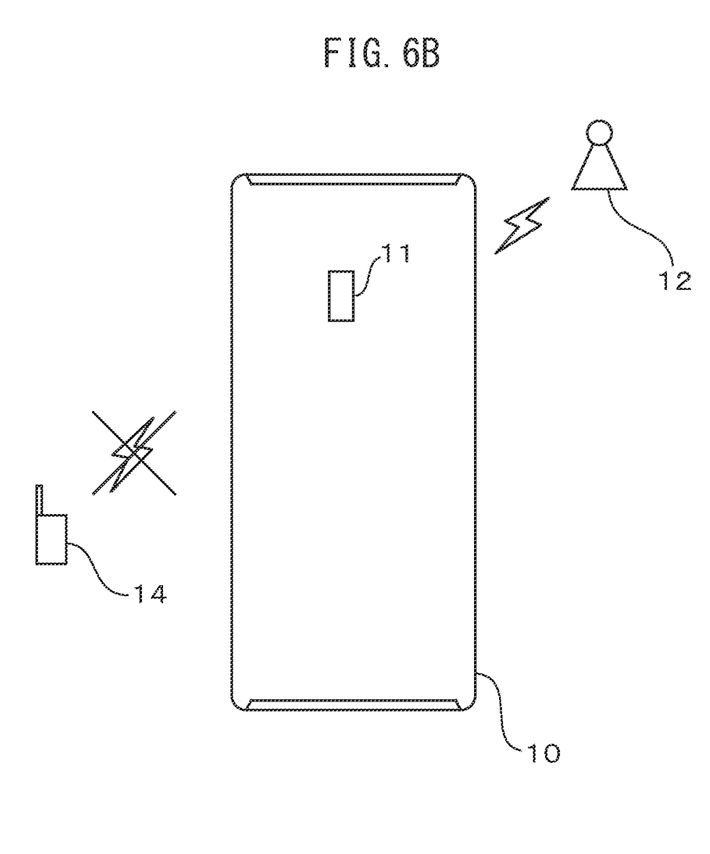
FIG. 6B is a schematic diagram for explaining a communication relay process according to the embodiment.

FIGS. 6A and 6B are schematic diagrams for explaining a communication relay process according to the present embodiment. In the example illustrated in FIG. 6A, the communication terminal 14 is possessed by a user (not illustrated) in the vehicle 10, and is thus in the vehicle 10. For this reason, the authentication device 13 permits relay communication for the communication terminal 14, and thus the wireless communication device 11 executes relay communication between the communication terminal 14 and the base station 12.

In the example illustrated in FIG. 6B, the communication terminal 14 is outside the vehicle 10. For this reason, the authentication device 13 does not permit relay communication for the communication terminal 14, and thus the wireless communication device 11 does not execute relay communication between the communication terminal 14 and the base station 12. In this case, the communication terminal 14 may communicate directly with the base station 12 wirelessly.

Figure 7:
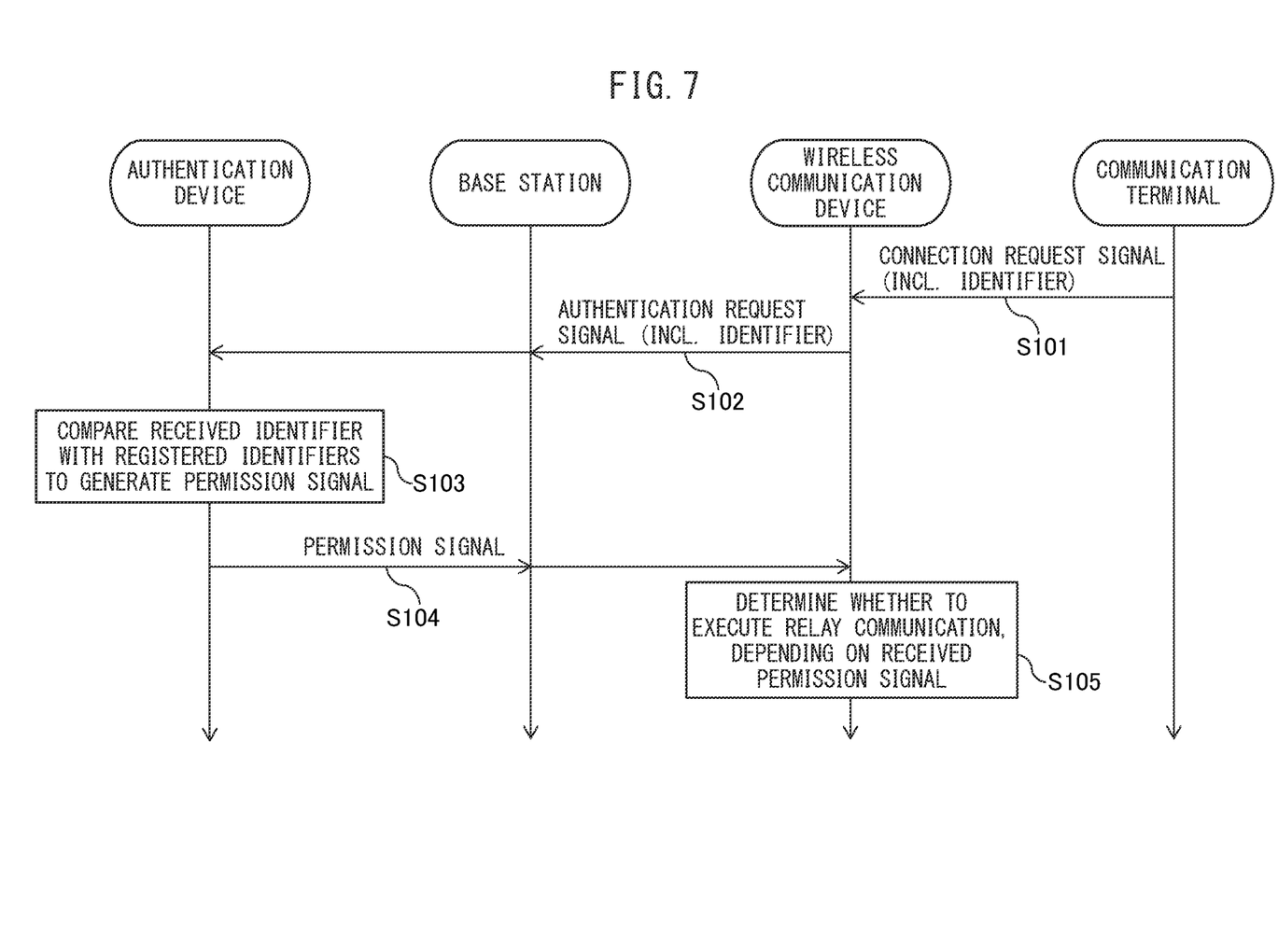
FIG. 7 illustrates the sequence of operation of the communication relay process.

FIG. 7 illustrates the sequence of the communication relay process according to the present embodiment. Every time a communication terminal 14 requests relay communication, the relay system 100 according to the present embodiment determines whether to execute relay communication in accordance with the sequence described below.

The communication terminal 14 sends a connection request signal including its own identifier (step S101). Receiving the connection request signal, the wireless communication device 11 generates an authentication request signal including the identifier included in the connection request signal, and sends the generated authentication request signal to the authentication device 13 via the base station 12 (step S102).

The authentication device 13 compares the identifier included in the received authentication request signal with registered identifiers, and generates a permission signal depending on the result of comparison (step S103). As described above, when the identifier included in the authentication request signal matches one of the registered identifiers, the authentication device 13 generates a permission signal indicating that relay communication for the communication terminal 14 is permitted. When the identifier included in the authentication request signal does not match any of the registered identifiers, the authentication device 13 generates a permission signal indicating that relay communication for the communication terminal 14 is not permitted. The authentication device 13 sends the generated permission signal to the wireless communication device 11 via the base station 12 (step S104). Depending on the received permission signal, the wireless communication device 11 determines whether to execute relay communication between the communication terminal 14 and the base station 12 (step S105). More specifically, when the permission signal indicates that relay communication is permitted, the wireless communication device 11 executes relay communication between the communication terminal 14 and the base station 12. When the permission signal indicates that relay communication is not permitted, the wireless communication device 11 omits to execute relay communication between the communication terminal 14 and the base station 12.

As described above, the relay system determines whether a registered identifier of a communication terminal possessed by a user in a vehicle matches an identifier of a terminal received from a relay base station mounted on the vehicle via a base station. Only when both identifiers match, does the relay base station relay wireless communication between the terminal and the base station. In this way, the relay system can limit communication terminals for which a service of relay of wireless communication is provided to ones possessed by users in the vehicle.

According to a modified example, the authentication device 13 may obtain the identifier of a communication terminal 14 possessed by a user, together with riding period information indicating a riding period during which the user is in the vehicle 10, earlier than a start time of the riding period from another device (not illustrated). The communication terminal 14 corresponding to the identifier obtained together with the riding period information is another example of the second communication terminal. The device from which the identifier and the riding period information are received is, for example, a server that manages reservations of seats of the vehicle 10, and is connected to the authentication device 13 via the core network 101. In this case, the identifier update unit 61 stores the identifier in the memory 52 in association with the riding period. In other words, the identifier of the communication terminal 14 possessed by the user is registered as a registered identifier only during the riding period. Thus the authentication determining unit 62 selects registered identifiers associated with riding periods including the time at which the authentication request signal is received. Only when the identifier included in the authentication request signal matches one of the selected registered identifiers, does the authentication determining unit 62 authenticate the communication terminal 14 identified by the identifier as one possessed by a user in the vehicle 10. The authentication determining unit 62 then generates a permission signal indicating that relay communication for the authenticated communication terminal 14 is permitted. In this modified example also, the relay system can have the same advantageous effect as that in the embodiment. In this modified example, the RFID reader 15 may be omitted from the vehicle 10 because the identifier of a communication terminal 14 possessed by a user in the vehicle 10 is registered without sending an identifier update request signal for the communication terminal 14.

According to another modified example, the processor 35 of the wireless communication device 11 may execute not only its functions in the embodiment but also the functions of the processor 53 of the authentication device 13, and the memory 34 may store registered identifiers. More specifically, an authentication determining unit of the processor 35 determines whether the identifier of a communication terminal 14 included in a connection request signal received by wireless communication matches a registered identifier, and, if so, permits relay communication between the communication terminal 14 and the base station 12. The communication control unit executes relay communication between the communication terminal 14 and the base station 12 only when relay communication is permitted. In this case, the communication relay process is simplified because the wireless communication device 11 itself manages the identifiers of communication terminals 14 possessed by users in the vehicle 10.

According to still another modified example, the vehicle 10 may be equipped with a wireless communication terminal (not illustrated) connected to the in-vehicle network, separately from the wireless communication device 11. The wireless communication standard to which the wireless communication terminal conforms may differ from and restrict communication speed more than the wireless communication standard to which the wireless communication device 11 conforms. In this case, the identifier of a communication terminal 14 read by the RFID reader 15 may be sent to the authentication device 13 via the wireless communication terminal.

The computer program for causing a computer to achieve the functions of the units included in the processor of the relay base station according to the embodiment or modified examples may be provided in a form recorded on a computer-readable storage medium. The computer program for causing a computer to achieve the functions of the units included in the processor of the authentication device according to the embodiment or modified examples may also be provided in a form recorded on a computer-readable storage medium. The computer-readable storage medium may be, for example, a magnetic medium, an optical medium, or a semiconductor memory.

As described above, those skilled in the art may make various modifications according to embodiments within the scope of the present invention.

What is claimed is:

1. A relay system comprising an authentication device connected to a base station, and a relay base station mounted on a vehicle and configured to relay wireless communication between the base station and at least one communication terminal, wherein
   the authentication device is configured to:
      determine whether a registered identifier of a registered terminal possessed by a user in the vehicle matches an identifier of a first communication terminal, which is among the at least one communication terminal, received from the relay base station via the base station,
      generate a permission signal indicating whether to permit relay of wireless communication between the first communication terminal and the base station, depending on the result of determination, and
      send the generated permission signal to the relay base station via the base station, and wherein
   the relay base station is configured to:
      relay wireless communication between the first communication terminal and the base station when the permission signal indicates that the relay is permitted, and
      omit to relay wireless communication between the first communication terminal and the base station when the permission signal indicates that the relay is not permitted.

2. The relay system according to claim 1, wherein the authentication device is further configured to register an identifier of a second communication terminal possessed by a user among the at least one communication terminal as one of the registered identifiers; the identifier being obtained via a reader provided in the vehicle for recording the user getting on and off the vehicle, when the user gets on the vehicle; and when the identifier of the second communication terminal obtained via the reader at the time when the user gets off the vehicle matches any of the registered identifiers, delete the matched registered identifier.

3. The relay system according to claim 1, wherein the authentication device is further configured to obtain an identifier of a second communication terminal possessed by a user among the at least one communication terminal, together with riding period information indicating a riding period during which the user is in the vehicle, earlier than a start time of the riding period, and register the identifier of the second communication terminal possessed by the user as the registered identifier only during the riding period.

4. A method for relaying wireless communication by a relay system comprising an authentication device connected to a base station, and a relay base station mounted on a vehicle and configured to relay wireless communication between the base station and at least one communication terminal, the method comprising:
   determining, by the authentication device, whether a registered identifier of a registered terminal possessed by a user in the vehicle matches an identifier of a first communication terminal, which is among the at least one communication terminal, received from the relay base station via the base station;
   generating, by the authentication device, a permission signal indicating whether to permit relay of wireless communication between the first communication terminal and the base station, depending on the result of determination;
   sending, by the authentication device, the generated permission signal to the relay base station via the base station;
   relaying, by the relay base station, wireless communication between the first communication terminal and the base station when the permission signal indicates that the relay is permitted; and
   omitting, by the relay base station, to relay wireless communication between the first communication terminal and the base station when the permission signal indicates that the relay is not permitted.

5. A relay base station mounted on a vehicle and capable of relaying wireless communication between a base station and at least one communication terminal, the relay base station comprising:
   a memory configured to store a registered identifier of a registered terminal possessed by a user in the vehicle; and
   a processor configured to:
      determine whether the registered identifier matches an identifier of a first communication terminal received by wireless communication,
      determine whether to permit relay of wireless communication between the first communication terminal and the base station, depending on the result of determination of match, the first communication terminal being among the at least one communication terminal,
      relay wireless communication between the first communication terminal and the base station when it is determined that the relay is permitted, and
      omit to relay wireless communication between the first communication terminal and the base station when it is determined that the relay is not permitted.

* * * * *